(12) United States Patent
Kevorkian (10) Patent No.: US 8,997,035 B2
(45) Date of Patent: Mar. 31, 2015

(54) EXTENSIBLE TEMPLATE-BASED CODE GENERATOR BUILDER

(75) Inventor: Gabriel Kevorkian, Suresnes (FR)

(73) Assignee: Sybase, Inc., Dublin, CA (US)

( * ) Notice: Subject to any disclaimer, the term of this patent is extended or adjusted under 35 U.S.C. 154(b) by 1154 days.

(21) Appl. No.: 12/550,940

(22) Filed: Aug. 31, 2009

(65) Prior Publication Data

US 2011/0055800 A1 Mar. 3, 2011

(51) Int. Cl.
*G06F 9/44* (2006.01)
(52) U.S. Cl.
CPC ... *G06F 8/10* (2013.01); *G06F 8/35* (2013.01)
USPC .......................................................... 717/104
(58) Field of Classification Search
CPC ....................................................... G06F 1/00
See application file for complete search history.

(56) References Cited

U.S. PATENT DOCUMENTS 5,930,795 A * 7/1999 Chen et al. ............................. 1/1
8,091,071 B2 * 1/2012 Tsantilis ....................... 717/120

FOREIGN PATENT DOCUMENTS

EP 202007 A2 * 11/1986 ............... G06F 9/44

* cited by examiner

*Primary Examiner* — Henry Tsai
*Assistant Examiner* — Juanito Borromeo
(74) *Attorney, Agent, or Firm* — Sterne Kessler Goldstein & Fox, P.L.L.C.

(57) ABSTRACT

A system, method, and computer program product are provided for producing aspects of a generation model. These include a domain model having one or more elements, and templates defined for the elements. The generation model is used to compile a code generator, which can be used to generate code from an input conforming to the domain model.

19 Claims, 6 Drawing Sheets

EXTENSIBLE TEMPLATE-BASED CODE GENERATOR BUILDER

BACKGROUND OF INVENTION

1. Field of the Invention

The present invention relates generally to code generators and, more specifically, to building model-driven code generators.

2. Description of the Background Art

As the complexity of the software development process increases, developers have released tools to facilitate the creation of new software components. Among these are code generators, which enable a user to describe elements of a software components using a descriptive language.

Commonly, the code generation process involves the creation of a template in an expected format. The template is then processed by a source code generator, which produces source code by locating expected elements within the template and replacing them with source code fragments according to a series of rules.

Although this technology has aided the rapid development of a number of software components, it is nevertheless necessary for a developer to spend the time to develop the code generator itself. Depending on the complexities of the expected input, such as the template, development of the code generator may require significant investment. This significant investment of time and other resources hampers efforts to provide code generators for a variety of applications.

Accordingly, what is desired is a means to facilitate the code generator development process.

SUMMARY OF INVENTION

The invention is directed to system, method, and computer program product embodiments for extensible template-based code generation.

Embodiments of the invention include a method comprising specifying a domain model comprising one or more elements, defining a template for an element in the domain model, the template comprising template language code for transforming the element into text, translating the template into a host language, and compiling the translated template to produce a code generator.

Embodiments of the invention additionally include a computer-readable medium having stored thereon computer-executable instructions that, if executed by a computing device, cause the computing device to perform a method comprising specifying a domain model comprising one or more elements, defining a template for an element in the domain model, the template comprising template language code for transforming the element into text, translating the template into a host language, and compiling the translated template to produce a code generator.

Embodiments of the invention further include a system comprising a memory storing a first specifying module configured to specify a domain model comprising one or more elements, a second defining module configured to define a template for an element in the domain model, the template comprising template language code for transforming the element into text, a translating module configured to translate the template into a host language, and a compiling module configured to compile the translated template to produce a code generator, and one or more processors configured to process the modules.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person skilled in the relevant art to make and use the invention.

The present invention will now be described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

I. Introduction

The following detailed description of the present invention refers to the accompanying drawings that illustrate exemplary embodiments consistent with this invention. Other embodiments are possible, and modifications can be made to the embodiments within the spirit and scope of the invention. Therefore, the detailed description is not meant to limit the invention. Rather, the scope of the invention is defined by the appended claims.

It would be apparent to one of skill in the art that the present invention, as described below, can be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

In order to develop a code generator, a developer must have an understanding of the particular elements which will comprise the input document. This enables the developer to create a code generator which will generate an expected equivalent snippet of arbitrary text, which may correspond to source code in accordance with an embodiment of the present invention, based on the presence of the elements. The traditional approach slows code development, as the code generator must first be designed from scratch to decipher the input document, using existing techniques. The technique described below solves these complications.

Figure 1:
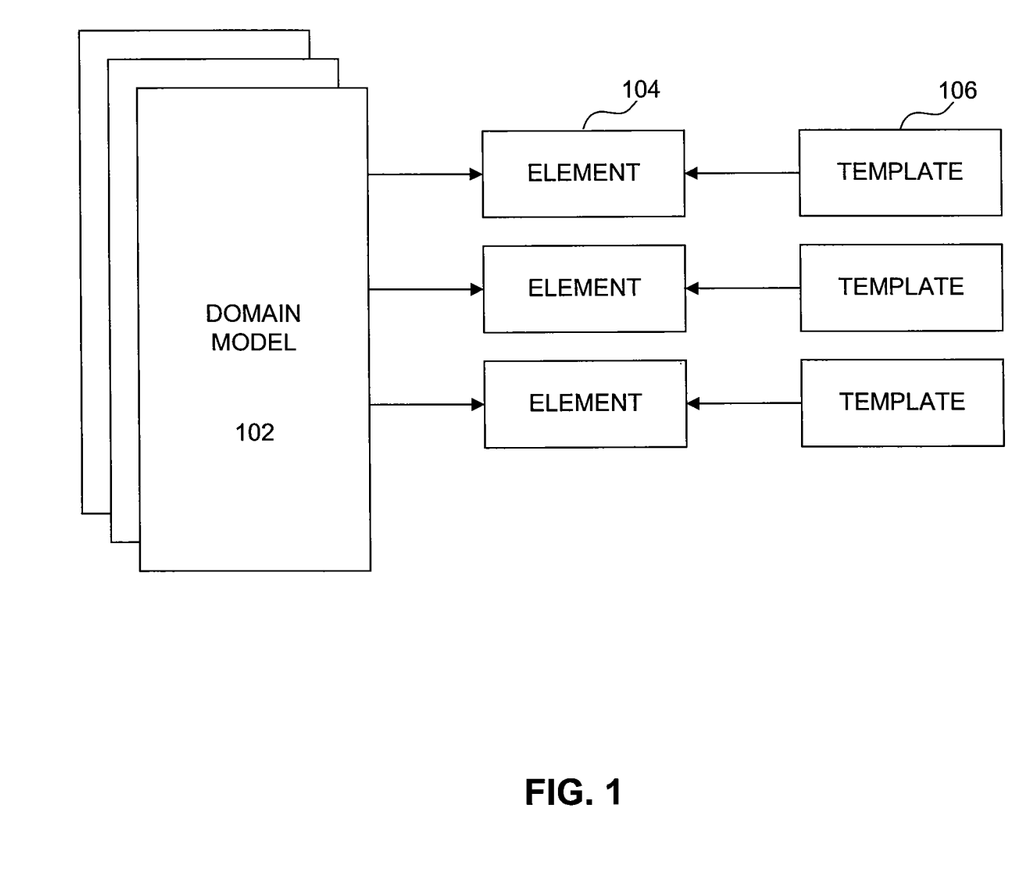
FIG. 1 is a generation model comprising a code generator project, in accordance with an embodiment of the present invention.

FIG. 1 is a generation model 100 comprising a code generator project, in accordance with an embodiment of the present invention. The generation model 100 includes or references one or more domain models 102. The domain models 102 each comprise one or more elements 104. For each element 104, a template 106 is written by the code generator developer, in accordance with an embodiment of the present invention.

By way of example, and not limitation, domain model 102 is a meta model of a final software component to be built using the code generator. It is this domain model 102 which specifies the structure and elements which can be utilized in the generation of a final software component. It can be written in any format, including, by way of example, and not limitation, as an XML schema. In accordance with a further embodiment of the present invention, domain model 102 may include structures from other development languages, including Java JAR files representing Java classes.

Previously, a creator of an input file conforming to domain model 102, such as an XML document used for the input to a code generator, would be required to conform the input file to the code generator's expected format. However, generation model 100 permits the use of any domain model 102, which is then broken down into its individual elements 104. The code generator developer can then create templates 106 for each of these individual elements 104 to ultimately produce a code generator which can interpret any input file which conforms to the domain model 102.

II. Creating a Generation Model

Figure 2:
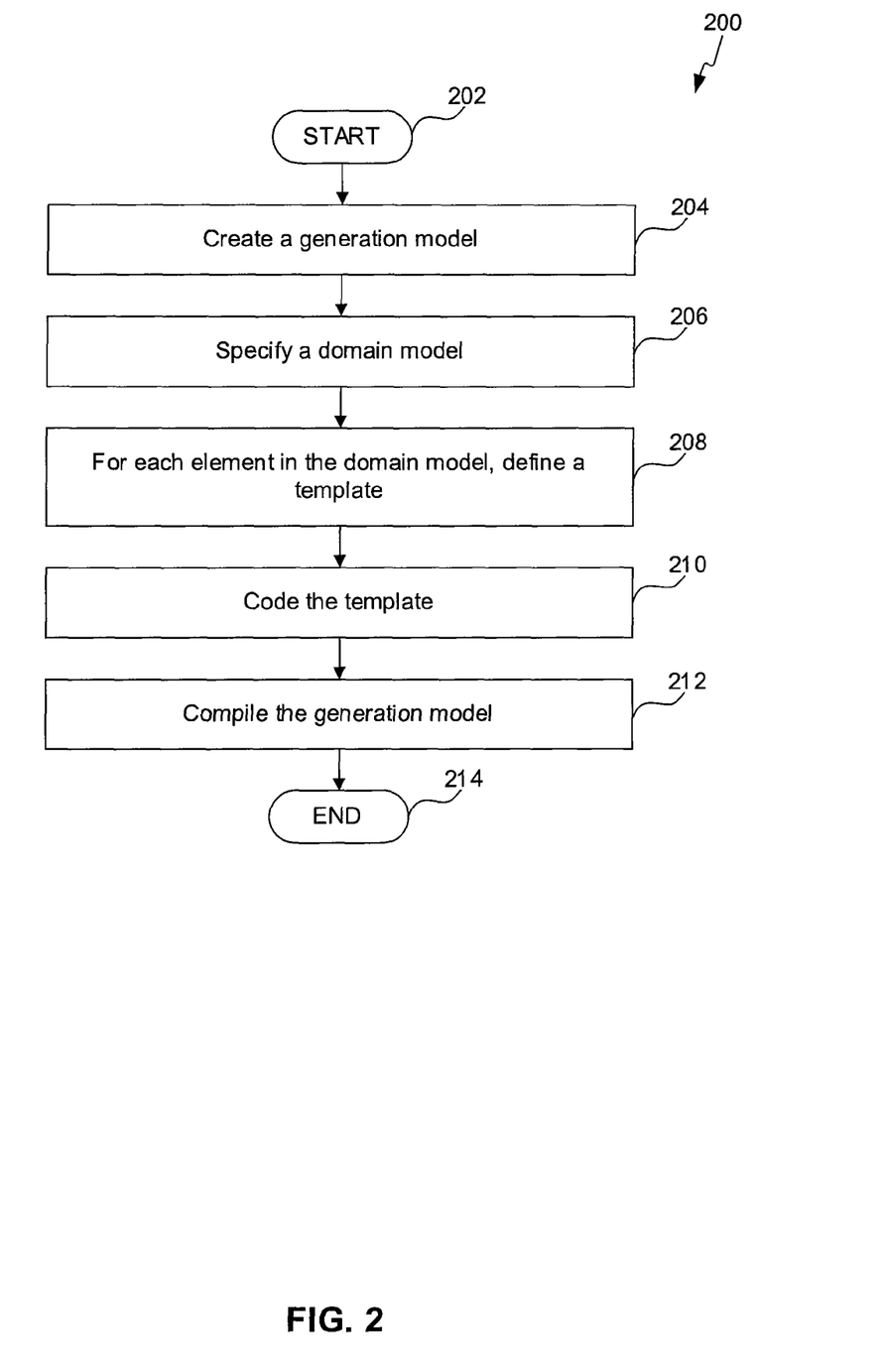
FIG. 2 is a flowchart illustrating steps by which a code generator developer can utilize the framework of the generation model to develop a code generator, in accordance with an embodiment of the present invention.

FIG. 2 is a flowchart 200 illustrating steps by which a code generator developer can utilize the framework of generation model 100 of FIG. 1 to develop a code generator, in accordance with an embodiment of the present invention. The method begins at step 202 and proceeds to step 204 where a generation model is created. The generation model specifies various aspects of the code generator using information specified in the subsequent steps.

At step 206, a domain model is specified, such as domain model 102. This domain model is specified within the generation model, in accordance with an embodiment of the present invention. As noted above, domain model 102 can include, by way of example, and not limitation, an XML schema defining the structure of any eventual input to be provided to the completed code generator.

The developer is then able to define one or more templates 106 for each element 104 within the domain model, in accordance with an embodiment of the present invention. This enables the code generator developed in this manner to output arbitrary text, which may include source code in accordance with an embodiment of the present invention, by following instructions provided within the template 106 whenever the associated element 104 is encountered within an input source. The templates operate as model-to-text transforms by producing a text output corresponding to element 104 in an input source, in accordance with an embodiment of the present invention. These templates are also included within the generation model. One skilled in the relevant arts will appreciate that, while mention is made throughout this document of source code as the output of a template, any text output may be generated based on the manner in which the template has been coded.

The elements 104 for which a template 106 is defined depends on the particular domain model 102 type. By way of example, and not limitation, if an Eclipse™ Modeling Framework ("EMF") Ecore metamodel is used as a domain model 102, then the elements 104 would be Ecore classes, and a template 106 would be defined for each Ecore class. Similarly, if Java class libraries are used as the domain model 102, then the elements 104 would be Java classes. For an XML schema used as a domain model 102, the various XML element types would correspond to the elements 104. One skilled in the relevant arts will recognize that other types of domain models 102 would have representative corresponding elements 104.

Each template is specified in a template language with which it is coded at step 210. As templates 106 are written for each element 104, the template 106 is independent of the structure of the input file. An XML input document conforming to an XML schema used as domain model 102 can use the elements defined within the XML schema in any allowed manner, and code from the appropriate template 106 will be run whenever the element is parsed within the XML input document.

In accordance with an embodiment of the present invention, the template language is a proprietary language which is extensible. Extending of the template language is discussed further in Section III, below. In accordance with a further embodiment of the present invention, the template language is object oriented. In accordance with an additional embodiment of the present invention, the language is the TemplateJ specification.

In accordance with an embodiment of the present invention, the template language is object-oriented. Templates to perform a model-to-text transform can take parameters as inputs, and support polymorphism based on parameter types. Additionally, the template language supports inheritance, such that it is possible to define additional elements aside from those defined in the domain model 102 using inheritance. It is therefore possible to view templates as operating as virtual methods which extend the contract defined by the elements of a domain model 102, although one skilled in the relevant arts will recognize that this comparison is a simplification for the purposes of explanation, and templates need not operate as traditional virtual methods.

At step 212, the generation model is compiled. Compiling the generation model can involve several steps depending on what components are included within the generation model. The template code is parsed and translated from the template language to a host language. This host language is the language in which other components are defined. In accordance with an embodiment of the present invention, the host language is Java. Extending the template language, as discussed in Section III, below, requires directives of the template language to be defined in the context of the host language. It is this definition which is used to parse and translate the template language code into the host language code.

Other sections of host language code are combined within the generation model, if present. The template language can interact with objects within the host language using the template language's own object-oriented capabilities to do so. The combination of the host language with the dynamicity of the template language permits taking advantage of object hierarchy in the input structure when available. For example, and not by limitation, assuming a schema which defines an element, "object", having only an "id" attribute, an XML document which specifies an optional "name" attribute would have that attribute ignored based on a strict interpretation of the schema, in accordance with an embodiment of the present invention. However, it is possible to write a template which uses the host language to access the underlying document object and retrieve the "name" attribute directly using, for example, the DOM API in the case of XML and return an object through which this attribute can be accessed. One skilled in the relevant arts will recognize that other uses for this integration with the host language exist, and the above is provided by way of example, and not limitation.

With all of the code translated to host language code, the generation model is run through a compiler. In accordance with an embodiment of the present invention, the compiler is a Java compiler, which generates Java bytecode. The result of this compilation is a code generator which is able to read input which conforms to the domain model 102 and to output source code corresponding to the input. The method ends at step 214.

Running the resulting code generator on an input conforming to the domain model 102 enables the code generator to interpret the input and execute the instructions derived from each template 106 whenever an element 104 associated with the template 106 appears within the input. At runtime, the code generator instantiates an executable expression tree which is used to perform the model-to-text transform on the input element and run the appropriate sections of code derived from template 106 within the expression tree. In accordance with an embodiment of the present invention, the instantiated expression tree for a template is maintained in memory, such that the instantiation occurs once per template upon first application to an element.

III. Annotating Relationships Between Elements

The generation model additionally allows for the annotation of the input structure to specify relationships not otherwise supported by the underlying meta-structure of the input. For example, an XML schema used as a domain model is only natively able to support tree-like structures showing containments, not complete graphs. An XML document may show relationships such as parent/child relationships between elements using, for example, an ID attribute.

An XML schema may, for example, establish that a "Package" element may contain one or more "Class" and "Interface" elements. Each of the "Class" and "Interface" elements include a Classifier comprising "id" and "name" attributes. Each "Class" may further include one or more "InterfaceRef" elements, each comprising an "id". An example XML document conforming to this schema would be:

```
<?xml version="1.0"?>
<Package>
    <Class id="o1" name="Shape" parent="">
        <InterfaceRef id="o4" />
        <InterfaceRef id="o5" />
    </Class>
    <Class id="o2" name="Rectangle" parent="o1" />
    <Class id="o3" name="Circle" parent="o1" />
    <Interface id="o4" name="IGeometry" />
    <Interface id="o5" name="IDrawable" />
</Package>
```

This document shows a relationship between a package and various classes and interfaces. The package contains classes and interfaces, a relationship which is natively shown within XML. However, without further information, reading the XML schema or the above XML document does not permit the inference of parent relationships specified by the attributes of the Rectangle and Circle classes (both have the Shape class as a parent), nor is it possible to infer that the InterfaceRef elements are references to other elements in the XML document.

The generation model may extend the XML schema, or other domain model 102, to annotate these relationships, in accordance with an embodiment of the present invention. In accordance with a further embodiment of the present invention, the generation model specifies an attribute which is used to index elements. In accordance with an additional embodiment of the present invention, the generation model specifies a reference attribute which defines a reference to another element based on a matching target element attribute. One skilled in the relevant arts will appreciate that other such relationships can be defined.

Further to the aforementioned example, the generation model specifies that the 'id' attribute of the Class and Interface elements be used to index these elements. The generation model then specifies that the 'parent' attribute defines a reference to another element, the element being a target element with a matching 'id' attribute. Similarly, for an InterfaceRef element, a relationship is established between its 'id' attribute and a target element with a matching 'id' attribute.

With these relationships established, it is then possible to write a template for the Class element which uses these relationships, in accordance with an embodiment of the present invention. For example, a template for the Class element may be:

```
class ${name}
@if (${parent} != "")
    extends ${parent.name}
@endif
@if (${InterfaceRefCollection.Count} > 0)
    implements<@foreach(InterfaceRefCollection)@>
        ${id.name}<@next(",")@>
@endif
```

The template code is able to access the "parent.name" attribute by relying on the relationship established in the generation model. If no parent exists, as in the case of the Shape class, then the first @if statement is able to resolve this when determining flow control. An example output of this template code, based on the above input XML document, would be:

Circle.def
class Circle
extends Shape
Rectangle.def
class Rectangle
extends Shape
Shape.def
class Shape
implements IGeometry, IDrawable IV. Utilizing Host Language Functionality within a Template In accordance with an embodiment of the present invention, the template language includes a directive which permits the calling of external functionality written in the host language. In accordance with a further embodiment of the present invention, this functionality is provided through the use of code blocks which enable host language code to be embedded within the template code. By way of example, and not limitation, such a code block may have the form:

```
<%([<parameter-list>])
<host language code>
<host language return statement>
%>
```

In accordance with an embodiment of the present invention, TemplateJ provides for host language code blocks of the general format:

<% (comma-separated-parameter-list) statement* return anObject; %>)

By way of example, and not limitation, it is possible to use this functionality to call an XPath query provided by Java, when Java is used as the host language. One skilled in the relevant arts will appreciate that other host languages and functionality of the other host languages may be used. Moreover, the return data from the directive is a host language object, in accordance with an embodiment of the present invention. The template language is able to manipulate this return data host language object as any other host language object, as previously noted in Section II.

In accordance with an embodiment of the present invention, one or more formatters are defined to format variable block output. In accordance with a further embodiment of the present invention, formatters are additionally used to assist in properly formatting data to be passed to the host language or received from the host language. By way of example, and not limitation, a "caption" formatter chain can be defined as follows:

${Caption:lower:upper(0):replace(".","_")}

The formatter chain is applied from left-to-right, in accordance with an embodiment of the present invention. The "Caption" term is the input parameter; in this example, it contains text which needs to be turned into a caption. The "lower" term takes the input parameter and converts all the characters into lowercase, whereas the "upper(0)" term converts the zeroth logical character (first character in the string) into an uppercase character. Finally, the "replace(".", "_")" term converts any periods in the string into underscores. The result is the output of the formatter chain. One skilled in the relevant arts will appreciate that the use of formatter chains permits evaluation of arbitrary operations aside from the formatting operation detailed above.

In a further non-limiting example, a Java XPath query may be made in the form $ {commands:xpath:xevalnodeset} to provide a command to XPath and receive a result therefrom. Furthermore, parameters in the formatter chain may themselves be expressions, and formatter chains may be nested within formatter chains.

V. Extending the Template Language

Figure 3:
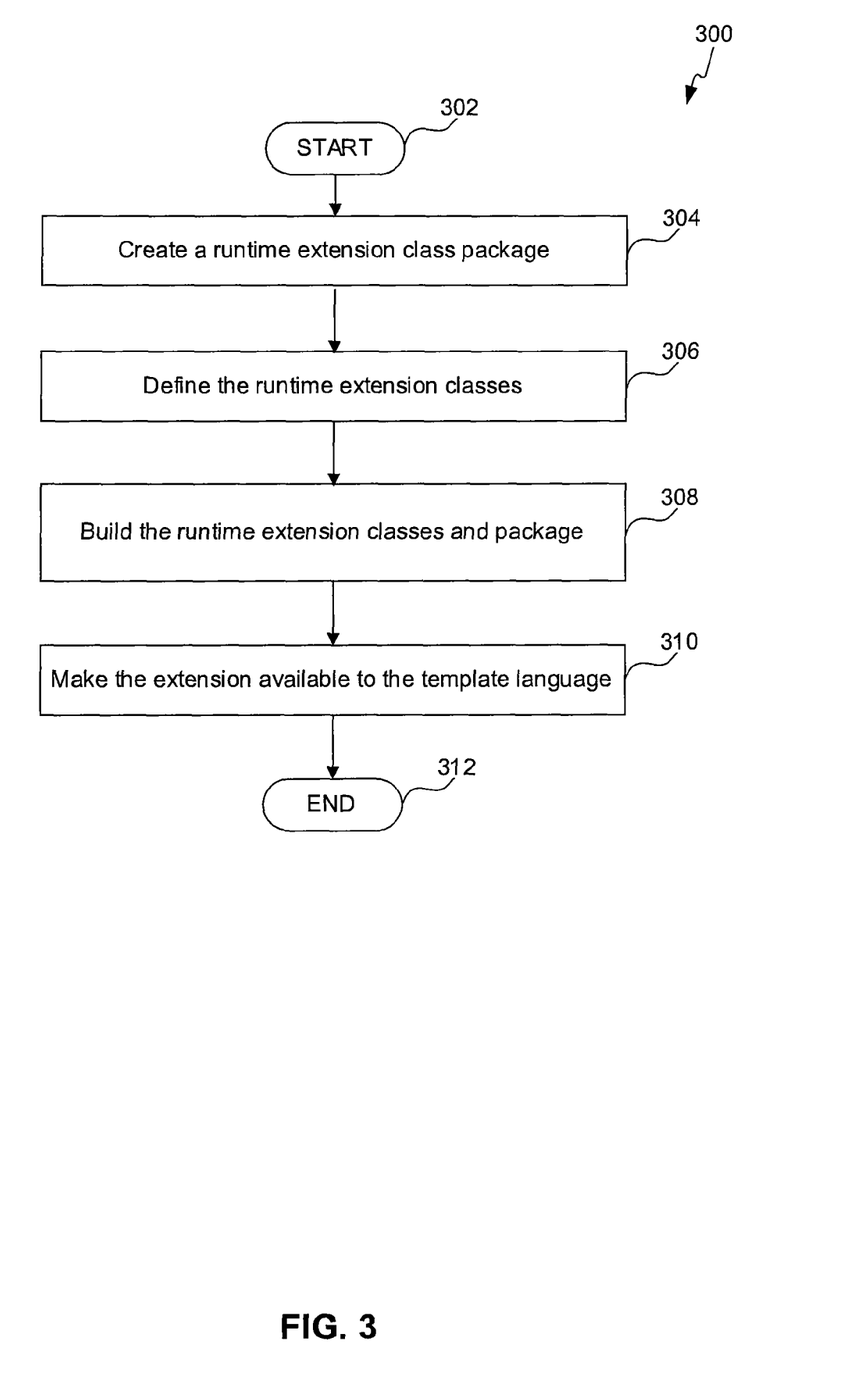
FIG. 3 is a flowchart illustrating steps by which the template language can be extended, in accordance with an embodiment of the present invention.

FIG. 3 is a flowchart 300 illustrating steps by which the template language can be extended, in accordance with an embodiment of the present invention. The method begins at step 302 and proceeds to step 304 where a runtime extension class package is created, in accordance with an embodiment of the present invention. In accordance with a further embodiment of the present invention, the runtime extension class package is a Java archive (JAR file) in the case of a TemplateJ implementation. One skilled in the relevant arts will recognize that the exact manner in which runtime extension classes are provided may vary, and the above are presented by way of example, and not limitation. Creating a package allows for various files and other resources to be added to the package, and can include, for example, domain models 102 and templates 106.

At step 306, a runtime extension class is defined, in accordance with an embodiment of the present invention. As an example, the template language can be extended to provide a @match directive, which is configured to operate like a typical switch statement in many operating systems.

Other template language syntax may likewise be extended. For example, new directives can be created by extending a directive class. In accordance with an embodiment of the present invention, TemplateJ directives take on the format "@directivename". By way of further example, and not limitation, formatters may be extended, enabling the usage of new terms within the formatters. One skilled in the relevant arts will appreciate that other syntax components of the template language may be extended.

In accordance with an embodiment of the present invention, defining the @match directive also requires defining the @endmatch directive, which used together indicate the beginning and end of the block directive. One skilled in the relevant arts will appreciate that the precise naming of these directives is open-ended, and a developer may choose any appropriate names. An example usage of the @match statement may therefore be as follows:

@match(${type})
@with("string")
string
@with("int")
Int32
@with
object
@endmatch In accordance with a further embodiment of the present invention, the @with directive will be defined to specify the regular expressions which will be matched as alternatives. If the @with directive does not have an argument, then it will match any input. Therefore, in the above example, any type which does not match "string" or "int" will be treated as a string by virtue of matching the base-case specified by the @with that does not have an argument.

Runtime extensions are based on a set of pre-existing directive and formatter base classes, in accordance with an embodiment of the present invention. In the aforementioned example, the @match directive is extended from a generic BlockDirective directive class, while the @endmatch directive is extended from a generic EndBlockDirective directive class. The @with directive is extended from an InBlockDirective directive class. One skilled in the relevant arts will appreciate that directives may be extended from other classes configured in a different manner, and the aforementioned extensions are provided by way of example, and not limitation.

After creating the directives within the development platform, the runtime extension classes are implemented for each directive. By way of example, and not limitation, these classes are the MatchDirective, WithDirective, and EndmatchDirective classes, although one skilled in the relevant arts will recognize the possibility for employing alternative naming conventions.

In accordance with an embodiment of the present invention, the definitions for the WithDirective and EndmatchDirective classes are annotated as being related to the MatchDirective class. The MatchDirective class can then be defined as follows, by way of example, and not limitation:

```
public class MatchDirective extends BlockDirective
{
    private IStringExpression input;
    public MatchDirective (IStringExpression input)
    {
        this.input = input;
    }
    ...
}
```

Accordingly, the WithDirective class can be defined as follows:

```
public class WithDirective extends InBlockDirective
{
```

-continued

```
    private IStringExpression regex;
    public WithDirective( )
    {
        this(null);
    }
    public WithDirective(IStringExpression regex)
    {
        this.regex = regex;
    }
    ...
}
```

Then, a developer extending the template language implements (i.e., overrides) an "apply" method derived from the parent BlockDirective class within the MatchDirective class. Continuing with the aforementioned example, this can be accomplished as follows, again by way of example, and not limitation:

```
@Override
public Object apply(IScope scope, List<ITemplatePartRef>
directives)
{
    Object result = null;
    // evaluate the input expression in the enclosing scope
    String in = input.eval(scope);
    for (int i = 1, n = directives.size( ) – 1; i < n; i++)
    {
        ITemplatePartRef altDirectiveRef = directives.get(i);
        Directive altDirective =
(Directive)altDirectiveRef.getPart( );
            if (altDirective instanceof WithDirective)
            {
                // evaluate the regex expression in the enclosing scope
                WithDirective withDirective =
(WithDirective)altDirective;
                IStringExpression regexExpression =
withDirective.getRegex( );
                String regex = regexExpression == null
                    ? null
                    : regexExpression.eval(scope);
    // if no expression specified (@with) or input matches
    // regular expression (@with(regex))
                if (regex == null || in.matches(regex))
                {
                    // get alternative sub-template (enclosed between this
                    // directive and its successor)
                    ITemplatePart altTemplate =
AltDirectiveRef.getTemplate( ).
                            getSubTemplate(altDirectiveRef,
                            directives.get(i +
1));
                    // evaluate and return
                    result = altTemplate.apply(scope);
                    break;
                }
            }
    }
    return result;
}
```

With the extension classes defined, the classes are built at step 308 and packaged. In the case of Java, the extension classes are packaged into a jar file. At step 310, the runtime extension classes are made available to the template language. In accordance with an embodiment of the present invention, the runtime extension classes are added to a list of available extensions, which the template language then has access to. The method then ends at step 312.

VI. Conditional Template Execution

In accordance with an embodiment of the present invention, it is possible to provide multiple templates 106 for a single element 104, with the appropriate template 106 to use in a particular circumstance being decided by a condition.

Figure 4:
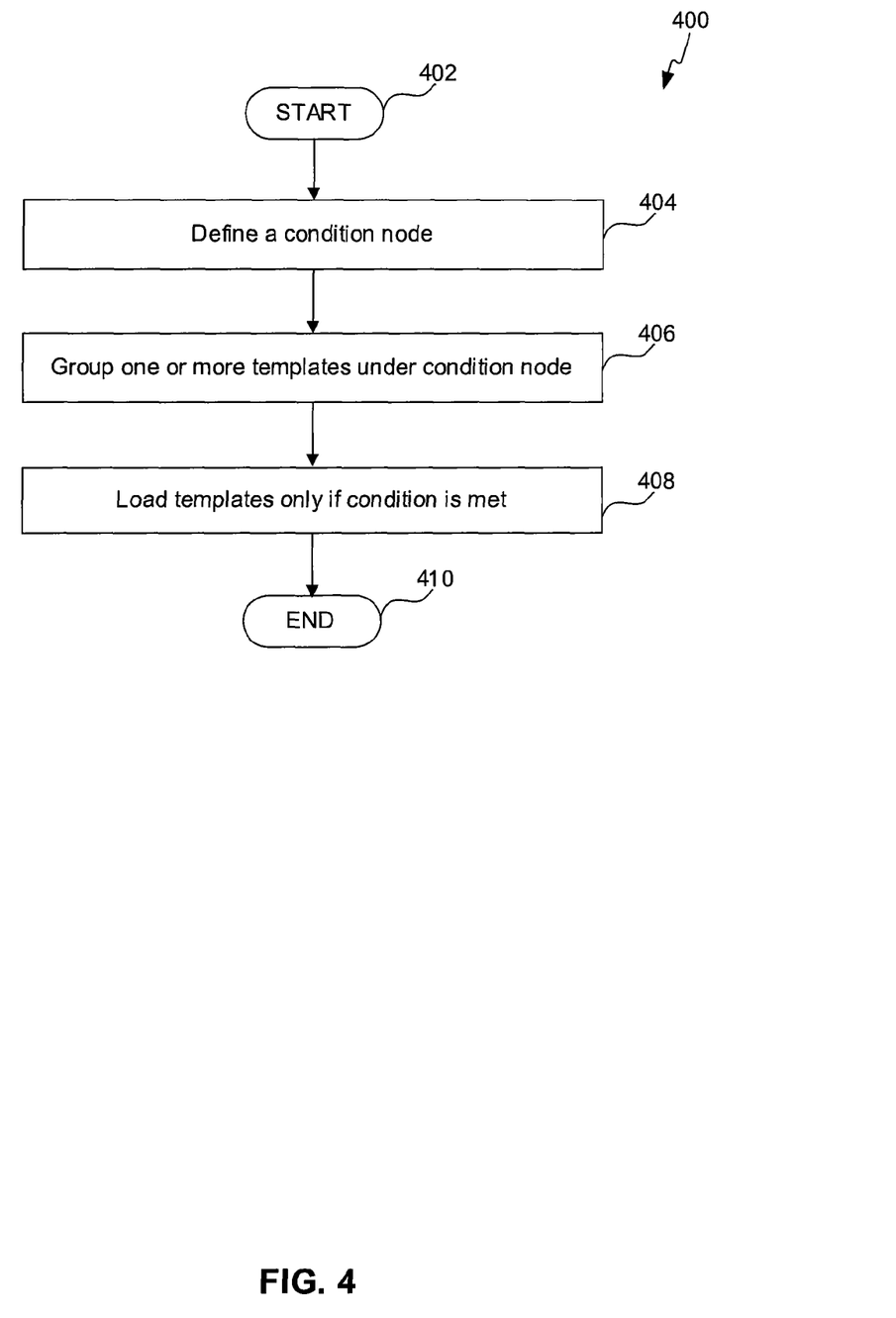
FIG. 4 is a flowchart illustrating steps by which conditional template execution is implemented, in accordance with an embodiment of the present invention.

FIG. 4 is a flowchart 400 illustrating steps by which conditional template execution is implemented, in accordance with an embodiment of the present invention. The method begins at step 402 and proceeds to step 404 where a condition node is defined under an element. This condition node defines a condition which will be tested against each instance of an element under which the condition node exists.

One or more templates 106 are associated with the particular element 104, and are applied to each instance of element 104, in accordance with an embodiment of the present invention. In the case of conditional template execution, this template 106 acts as the default template. It is, in effect, a base case template in the event that no other conditions are met, although one skilled in the relevant arts will appreciate that other methods for associating particular templates with relevant conditions exist, and this method is presented by way of example, and not limitation.

Accordingly, at step 404, a condition node is defined. One or more templates are then grouped under this condition at step 406. These grouped templates include, by way of example and not limitation, additional templates 106 which should be used instead of the default template in the event that the condition is met.

The grouped templates are then only loaded and used at step 408 instead of the default template if the condition is met, and the method ends at step 410. This allows for varying implementations for various elements depending on different conditions, and can allow for template specialization. If the condition is met, the grouped templates are used instead of the default template.

In accordance with an additional embodiment of the present invention, conditions may be applied to sub-templates. In accordance with another embodiment of the present invention, conditions may enclose one or more top-level templates such that files are only generated for instances of elements which satisfy the conditions. In accordance with a further embodiment of the present invention, conditions may be nested, such that satisfying the innermost condition requires satisfying all of its enclosing conditions.

VII. Integrated Development Environment

Figure 5:
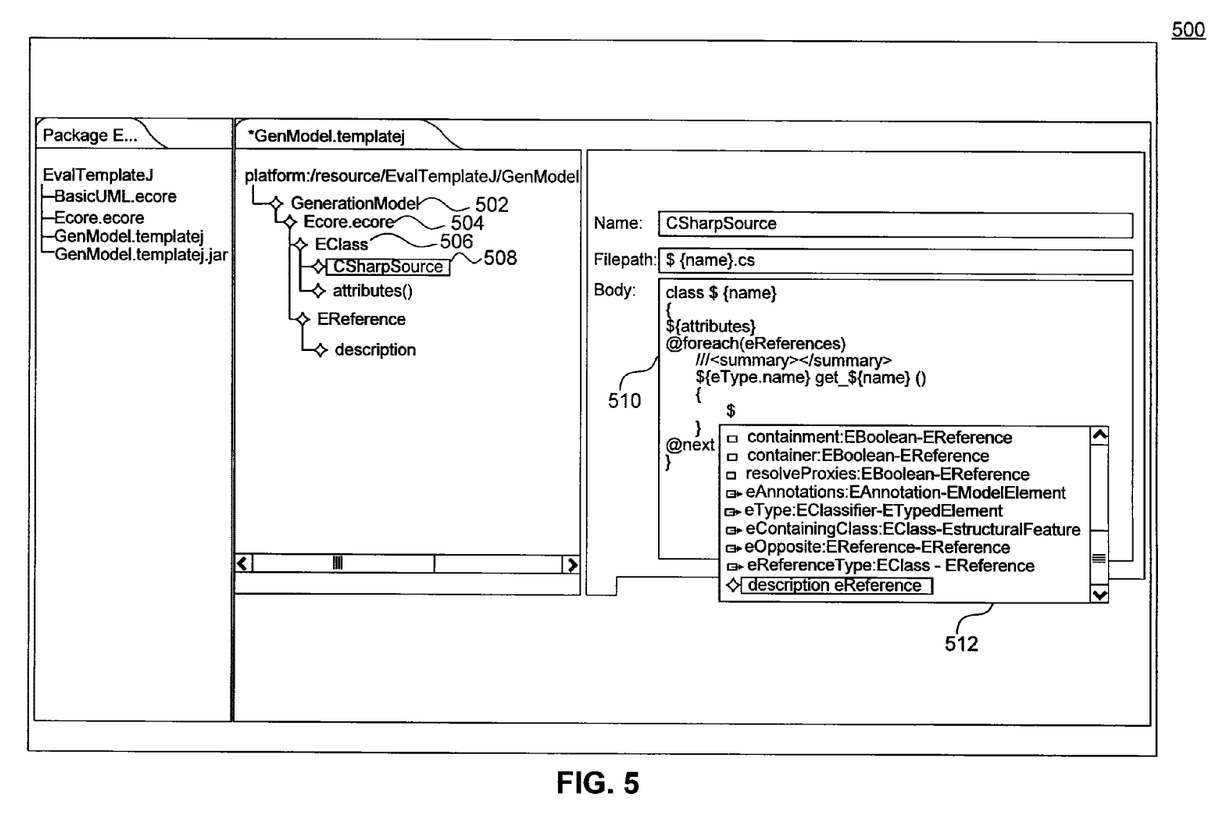
FIG. 5 is an example integrated development environment, in accordance with an embodiment of the present invention.

FIG. 5 is an example integrated development environment 500, in accordance with an embodiment of the present invention. The integrated development environment 500 shown in FIG. 5 is the Eclipse™ SDK, although one skilled in the relevant arts can apply the hierarchical techniques to other development environments. The environment 500 shows within it a generation model 502 which has been loaded as the current project.

In accordance with an embodiment of the present invention, the hierarchy shows the generation model 502, a domain model 504, an element 506, and a template 508, corresponding to the concepts previously discussed. Moreover, the development environment shows that the template 508 has been selected, and the template code is shown on the display at element 510.

Element 512 shows a completion window, in accordance with an embodiment of the present invention. This window enables completion of various elements of the template language including, by way of example and not limitation, general template language features, directives, members, reference members, and formatters. As illustrated in FIG. 5, element 512 shows a set of properties available for a particular object within the template language, in accordance with an embodiment of the present invention. In accordance with a further embodiment of the present invention, an extended directive created in the manner detailed in Section III would appear within this list, along with other directives.

VIII. Example Computer System Implementation

Figure 6:
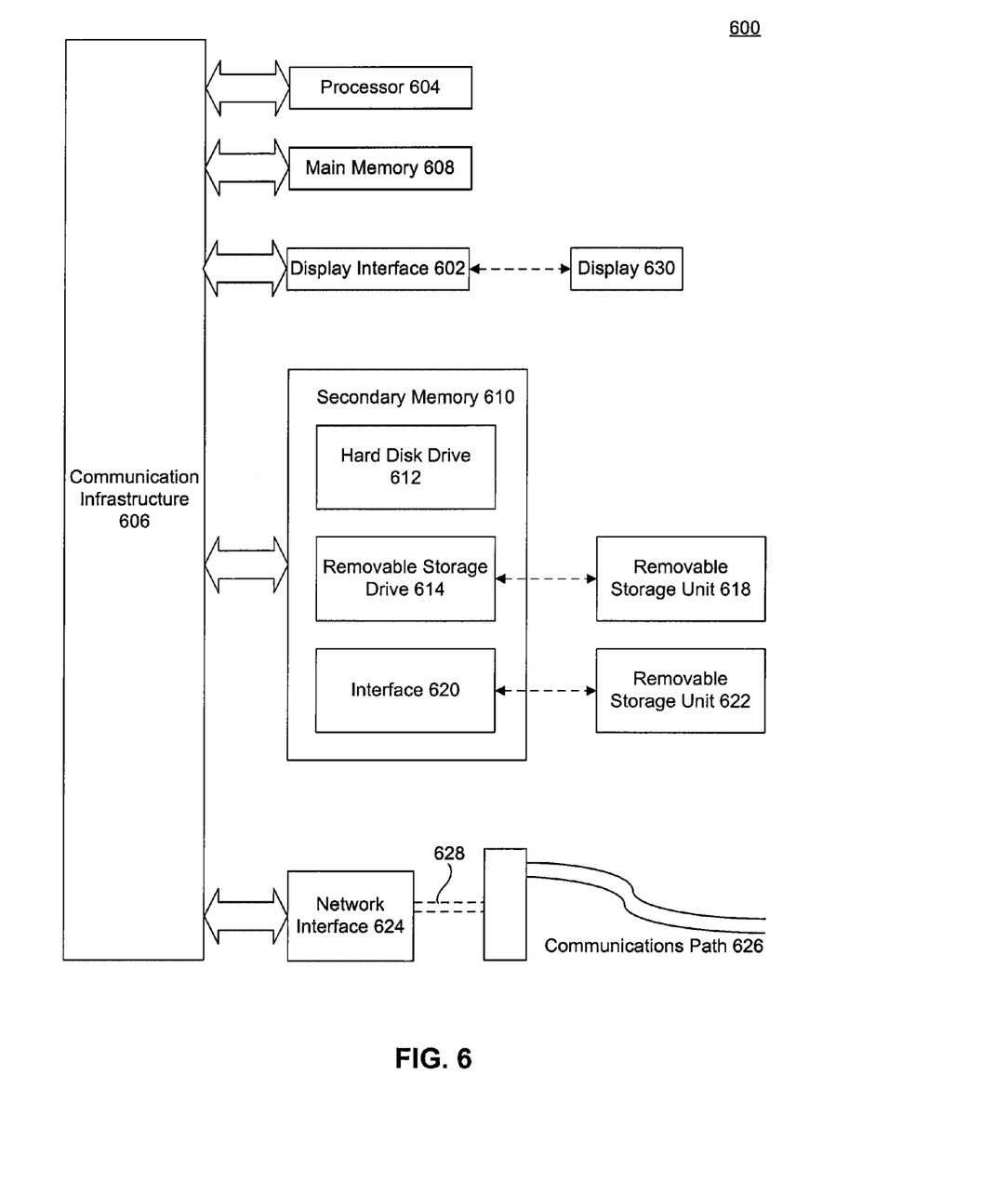
FIG. 6 depicts an example computer system in which embodiments of the present invention may be implemented.

Various aspects of the present invention can be implemented by software, firmware, hardware, or a combination thereof. FIG. 6 illustrates an example computer system 600 in which the present invention, or portions thereof, can be implemented as computer-readable code. For example, the methods illustrated by flowcharts 200 of FIG. 2, 300 of FIG. 3, and 400 of FIG. 4, can be implemented in system 600. Various embodiments of the invention are described in terms of this example computer system 600. After reading this description, it will become apparent to a person skilled in the relevant art how to implement the invention using other computer systems and/or computer architectures.

Computer system 600 includes one or more processors, such as processor 604. Processor 604 can be a special purpose or a general purpose processor. Processor 604 is connected to a communication infrastructure 606 (for example, a bus or network).

Computer system 600 also includes a main memory 608, preferably random access memory (RAM), and may also include a secondary memory 610. Secondary memory 610 may include, for example, a hard disk drive 612, a removable storage drive 614, and/or a memory stick. Removable storage drive 614 may comprise a floppy disk drive, a magnetic tape drive, an optical disk drive, a flash memory, or the like. The removable storage drive 614 reads from and/or writes to a removable storage unit 618 in a well known manner. Removable storage unit 618 may comprise a floppy disk, magnetic tape, optical disk, etc. which is read by and written to by removable storage drive 614. As will be appreciated by persons skilled in the relevant art(s), removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Communications interface 624 may include a modem, a network interface (such as an Ethernet card), a communications port, a PCMCIA slot and card, or the like. Software and data transferred via communications interface 624 are in the form of signals which may be electronic, electromagnetic, optical, or other signals capable of being received by communications interface 624. These signals are provided to communications interface 624 via a communications path 626. Communications path 626 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 618, removable storage unit 622, and a hard disk installed in hard disk drive 612. Signals carried over communications path 626 can also embody the logic described herein. Computer program medium and computer usable medium can also refer to memories, such as main memory 608 and secondary memory 610, which can be memory semiconductors (e.g. DRAMs, etc.). These computer program products are means for providing software to computer system 600.

Computer programs (also called computer control logic) are stored in main memory 608 and/or secondary memory 610. Computer programs may also be received via communications interface 624. Such computer programs, when executed, enable computer system 600 to implement the present invention as discussed herein. In particular, the computer programs, when executed, enable processor 604 to implement the processes of the present invention, such as the steps in the methods illustrated by flowcharts 200 of FIG. 2, 300 of FIG. 3, and 400 of FIG. 4, discussed above. Accordingly, such computer programs represent controllers of the computer system 600. Where the invention is implemented using software, the software may be stored in a computer program product and loaded into computer system 600 using removable storage drive 614, interface 620, hard drive 612 or communications interface 624.

The invention is also directed to computer program products comprising software stored on any computer useable medium. Such software, when executed in one or more data processing device, causes a data processing device(s) to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

X. Conclusion

While various embodiments of the present invention have been described above, it should be understood that they have been presented by way of example only, and not limitation. It will be understood by those skilled in the relevant art(s) that various changes in form and details may be made therein without departing from the spirit and scope of the invention as defined in the appended claims. It should be understood that the invention is not limited to these examples. The invention is applicable to any elements operating as described herein. Accordingly, the breadth and scope of the present invention should not be limited by any of the above-described exemplary embodiments, but should be defined only in accordance with the following claims and their equivalents.

What is claimed is:

1. A method comprising:
   specifying, by a computer system, a domain model, wherein the domain model comprises a plurality of elements based on structures from one or more development languages;
   generating a plurality of templates, wherein each template is based on an element of the domain model and comprises template language code for use in a code generator;
   translating each of the plurality of templates into a corresponding host language; and
   generating the code generator by compiling the plurality of translated templates, wherein the code generator is configured to receive an input conforming to the domain model and to convert the received input into source code based on the plurality of translated templates.

2. The method of claim 1, further comprising:
creating a generation model; and
associating the domain model and the template with the generation model.

3. The method of claim 1, further comprising:
building and packaging an extension class; and
making the extension class available to the template language code.

4. The method of claim 1, wherein the domain model is a meta-model of an input to the code generator.

5. The method of claim 4, further comprising:
providing an input to the code generator conforming to the domain model; and
obtaining generated code from the code generator based on the input.

6. The method of claim 5, wherein the domain model is an XML schema and the input is an XML document.

7. The method of claim 1, wherein the domain model is an XML schema.

8. The method of claim 1, further comprising:
defining a condition node for each of the plurality of elements;
grouping one or more files under the condition node; and
loading the grouped files only if a condition is met.

9. The method of claim 8, wherein the one or more files comprise an additional template, further comprising:
using the additional template instead of the template if the condition is met.

10. A computer-readable storage device having stored thereon computer-executable instructions, execution of which, by a computing device, causes the computing device to perform operations comprising:
specifying, by a computer system, a domain model, wherein the domain model comprises a plurality of elements based on structures from one or more development languages;
generating a plurality of templates, wherein each template is based on an element of the domain model and comprises template language code for use in a code generator;
translating each of the plurality of templates into a corresponding host language; and
generating the code generator by compiling the plurality of translated templates, wherein the code generator is configured to receive an input conforming to the domain model and to convert the received input into source code based on the plurality of translated templates.

11. The computer-readable storage device of claim 10, the operations further comprising:
creating a generation model; and
associating the domain model and the template with the generation model.

12. The computer-readable storage device of claim 10, the operations further comprising:
building and packaging an extension class; and
making the extension class available to the template language code.

13. The computer-readable storage device of claim 10, wherein the domain model is a meta-model of an input to the code generator.

14. The computer-readable storage device of claim 13, the operations further comprising;
providing an input to the code generator conforming to the domain model; and
obtaining generated code from the code generator based on the input.

15. The computer-readable storage device of claim 14, wherein the domain model-is an XML schema and the input is an XML document.

16. The computer-readable storage device of claim 10, wherein the domain model is an XML schema.

17. The computer-readable storage device of claim 10, the operations further comprising:
defining a condition node for each of the plurality of elements;
grouping one or more files under the condition node; and
loading the grouped files only if a condition is met.

18. The computer-readable storage device of claim 17, wherein the one or more files comprise an additional template, the operations further comprising;
using the additional template instead of the template if the condition is met.

19. A system comprising:
a memory configured to store:
a specifying module configured to specify a domain model comprising one or more elements, based on structures from one or more development languages;
a generating model configured to generate a plurality of templates, each template based on an element of the domain model and comprising template language code for use in a code generator:
a translating module configured to translate each of the plurality of templates into a corresponding host language; and
a code generator developing module configured to compile the plurality of translated templates to produce the code generator, wherein the code generator is configured to receive an input conforming to the domain model and to convert the received input into source code based on the plurality of translated templates; and
one or more processors configured to process the modules.

* * * * *